United States Patent
Brownholtz et al.

(10) Patent No.: US 9,582,568 B2
(45) Date of Patent: *Feb. 28, 2017

(54) LOGGING EXTERNAL EVENTS IN A PERSISTENT HUMAN-TO-HUMAN CONVERSATIONAL SPACE

(71) Applicant: International Business Machines Corporation, Armonk, NY (US)

(72) Inventors: Elizabeth A. Brownholtz, Andover, MA (US); Werner Geyer, Boston, MA (US); Sandra L. Kogan, Newton, MA (US); Michael Muller, Medford, MA (US); Eric M. Wilcox, Winchester, MA (US)

(73) Assignee: International Business Machines Corporation, Armonk, NY (US)

( * ) Notice: Subject to any disclaimer, the term of this patent is extended or adjusted under 35 U.S.C. 154(b) by 258 days.

This patent is subject to a terminal disclaimer.

(21) Appl. No.: 14/461,334

(22) Filed: Aug. 15, 2014

(65) Prior Publication Data
US 2015/0081698 A1 Mar. 19, 2015

Related U.S. Application Data

(63) Continuation of application No. 10/894,526, filed on Jul. 19, 2004, now Pat. No. 8,832,200.

(51) Int. Cl.
| | |
|---|---|
| *G06F 15/16* | (2006.01) |
| *G06F 17/30* | (2006.01) |
| *H04L 12/18* | (2006.01) |
| *G06F 17/22* | (2006.01) |
| *H04L 12/58* | (2006.01) |
| *H04L 29/08* | (2006.01) |

(52) U.S. Cl.
CPC .... *G06F 17/30657* (2013.01); *G06F 17/2235* (2013.01); *G06F 17/2247* (2013.01); *H04L 12/1813* (2013.01); *H04L 51/18* (2013.01); *H04L 67/02* (2013.01)

(58) Field of Classification Search
None
See application file for complete search history.

(56) References Cited

U.S. PATENT DOCUMENTS

| | | |
|---|---|---|
| 6,430,604 B1 | 8/2002 | Ogle et al. |
| 6,449,646 B1 | 9/2002 | Sikora et al. |

(Continued)

FOREIGN PATENT DOCUMENTS

| | | |
|---|---|---|
| GB | 2389736 | 12/2003 |
| WO | WO 2005006226 | 1/2005 |

*Primary Examiner* — Brian P Whipple
(74) *Attorney, Agent, or Firm* — Steven M. Greenberg, Esq.; CRGO Law

(57) ABSTRACT

A method, system and apparatus for logging external events in a human-to-human conversational space. In a preferred aspect of the invention, a persistent human-to-human conversational system can include a persistent human-to-human conversational tool such as a persistent chat tool, and an external event processor coupled to the persistent human-to-human conversational tool. The system further can include a query interface to the persistent human-to-human conversational tool. Finally, the system can include one or more collaborative tools communicatively linked to the persistent human-to-human conversational tool.

10 Claims, 2 Drawing Sheets

(56) References Cited

U.S. PATENT DOCUMENTS

| | | |
|---|---|---|
| 6,742,116 B1 | 5/2004 | Matsui et al. |
| 7,039,676 B1 | 5/2006 | Day et al. |
| 7,054,863 B2 | 5/2006 | Lasensky et al. |
| 7,092,509 B1 | 8/2006 | Mears et al. |
| 7,653,691 B2 | 1/2010 | Lasensky et al. |
| 8,291,028 B2 | 10/2012 | Lasensky et al. |
| 8,819,132 B2 * | 8/2014 | Serr ............ G06Q 10/107 709/204 |
| 2001/0037365 A1 | 11/2001 | Montague et al. |
| 2002/0131561 A1 * | 9/2002 | Gifford ............ G06Q 10/107 379/67.1 |
| 2002/0138582 A1 | 9/2002 | Chandra et al. |
| 2002/0161775 A1 | 10/2002 | Lasensky et al. |
| 2003/0187925 A1 | 10/2003 | Inala et al. |
| 2004/0054729 A1 | 3/2004 | Fukuizumi et al. |
| 2004/0111479 A1 | 6/2004 | Borden et al. |
| 2005/0058260 A1 | 3/2005 | Lasensky et al. |
| 2005/0060643 A1 | 3/2005 | Glass et al. |
| 2006/0123060 A1 | 6/2006 | Allen et al. |
| 2007/0277238 A1 | 11/2007 | Margalit et al. |
| 2010/0144329 A1 | 6/2010 | Lasensky et al. |
| 2013/0073656 A1 | 3/2013 | Hullfish et al. |
| 2013/0073657 A1 | 3/2013 | Hullfish et al. |
| 2013/0172025 A1 | 7/2013 | Odell et al. |
| 2013/0172026 A1 | 7/2013 | Odell et al. |
| 2016/0099892 A1 * | 4/2016 | Palakovich ............ H04L 51/04 709/206 |

* cited by examiner

LOGGING EXTERNAL EVENTS IN A PERSISTENT HUMAN-TO-HUMAN CONVERSATIONAL SPACE

CROSS-REFERENCE TO RELATED APPLICATION

This application is a Continuation of U.S. application Ser. No. 10/894,526, filed Jul. 19, 2004, now U.S. Pat. No. 8,832,200, which is incorporated herein by reference in its entirety.

BACKGROUND OF THE INVENTION

Statement of the Technical Field

The present invention relates to collaborative computing and more particularly to persistent human-to-human conversational tools.

Description of the Related Art

Real time communications systems provide a substantial enhancement over more traditional, asynchronous communications systems. Electronic mail delivery systems, the prototypical asynchronous communications systems, in its time represented a giant leap forward in respect to global interpersonal communications. Prior to electronic mail, individuals primarily communicated via telephone, facsimile and post. With electronic mail, however, individuals expect near instant delivery of text, and even imagery, audio and video, without incurring the delay typical of the postal system, or the expense associated with telephony and fax technologies.

Despite the ubiquity of electronic mail, asynchronous communications system lack several elements common in the realm of real time communications systems. In particular, the seemingly instant delivery of a message cannot be experienced in the world of electronic mail. In an real-time society, the minor latencies associated with electronic mail often cannot be suitable for the task at hand where a real-time conversation will be required in addressing a problem or performing a collaborative task. More importantly, often the feel and nature of a "conversation" as it is known to human beings only can be approximated through real time communications where the participants to a conversation feel the spontaneity of an exchange of ideas, much as is the case in a live, face-to-face conversation.

The recent rapid development of the Internet has led to advanced modes of synchronous, real-time collaboration able to fulfill the real-time communicative requirements of the modern computing participant. Using the Internet as a backbone, individuals worldwide can converge in real-time in cyberspace to share ideas, documents and images in a manner not previously possible through conventional telephony and video conferencing. To facilitate collaboration over the Internet, a substantial collection of technologies and protocols have been assembled to effectively deliver audio, video and data over the single data communications medium of the Internet. These technologies include several human-to-human collaborative environments such as instant messaging, application sharing, shared document libraries persistent chat rooms, and new communicative environments that support persistent chat and other persistent documents and objects.

In a persistent chat environment, a collaborative space can be established in which the postings of chat participants can be maintained in a bulletin board fashion, regardless of whether participants are actively engaged in the chat session at any one time. In a prototypical "chat" or "persistent chat", which can be understood as terms of art to refer to both the act of chatting and the conversational space and/or transcript in which that act of chatting has occurred, participants post conversational contributions referred to as "turns" in the chat visible to all participants. Importantly, the persistent nature of the persistent chat can result from the persistence of the turns in the chat transcript regardless of whether any participants remain actively participants in the chat. Thus, the persistent chat can function as an important collaborative tool for a long-standing collaboration.

As a human-to-human conversational space, the persistent chat can form the basis of a long standing collaboration. Yet, it will be recognized by the skilled artisan that not all collaboration can be documented within the persistent chat. In this regard, much collaborative content can be produced and maintained externally to the persistent chat. As a result, to the extent that the persistent chat is to act as a record of a long-standing collaborative effort, however, a significant portion of the collaborative effort will be absent from the record produced and maintained in the persistent chat.

SUMMARY OF THE INVENTION

The present invention addresses the deficiencies of the art in respect to collaborative computing and provides a novel and non-obvious method, system and apparatus for logging external events in a human-to-human conversational space. In a preferred aspect of the invention, a persistent human-to-human conversational system can include a persistent human-to-human conversational tool such as a persistent chat tool, and an external event processor coupled to the persistent human-to-human conversational tool. The system further can include a query interface to the persistent human-to-human conversational tool. Finally, the system can include one or more collaborative tools communicatively linked to the persistent human-to-human conversational tool.

A method for processing external events in a persistent human-to-human conversational space can include persisting a human-to-human conversational space, posting turns in the persistent human-to-human conversational space, and, further posting information relating to external events in the persistent human-to-human conversational space. The method further can include the steps of persisting additional human-to-human conversational spaces and performing query operations against the human-to-human conversational space and the additional human-to-human conversational spaces. Notably, the method can include receiving notifications of the external events and, responsive to receiving the notifications, converting the notifications into the information and posting the information to the persistent human-to-human conversational space.

Preferably, the converting step can include the step of creating hyperlinks for content relating to the notifications. Alternatively, the converting step can include the step of creating doc-links to documents related to the notifications. As another alternative, the converting step can include the step of creating embeddable content related to the notifications. Finally, as yet another alternative, the converting step can include the step of creating markup language formatted content related to the notifications.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for logging external events in a persistent human-to-human conversational space. In a preferred aspect of the invention, a persistent human-to-human conversational tool can add turns to a persistent human-to-human conversational space. Additionally, the persistent human-to-human conversational tool can receive data relating to the occurrence of events external to the persistent human-to-human conversational space. In this regard, turns can be generated from the received data and posted to the persistent human-to-human conversational space. Consequently, the persistent human-to-human conversational space can more comprehensively reflect a rich, lingering to long-standing collaboration, including both conversations and various forms of documents and data, between collaborators in a collaborative environment.

Figure 1:
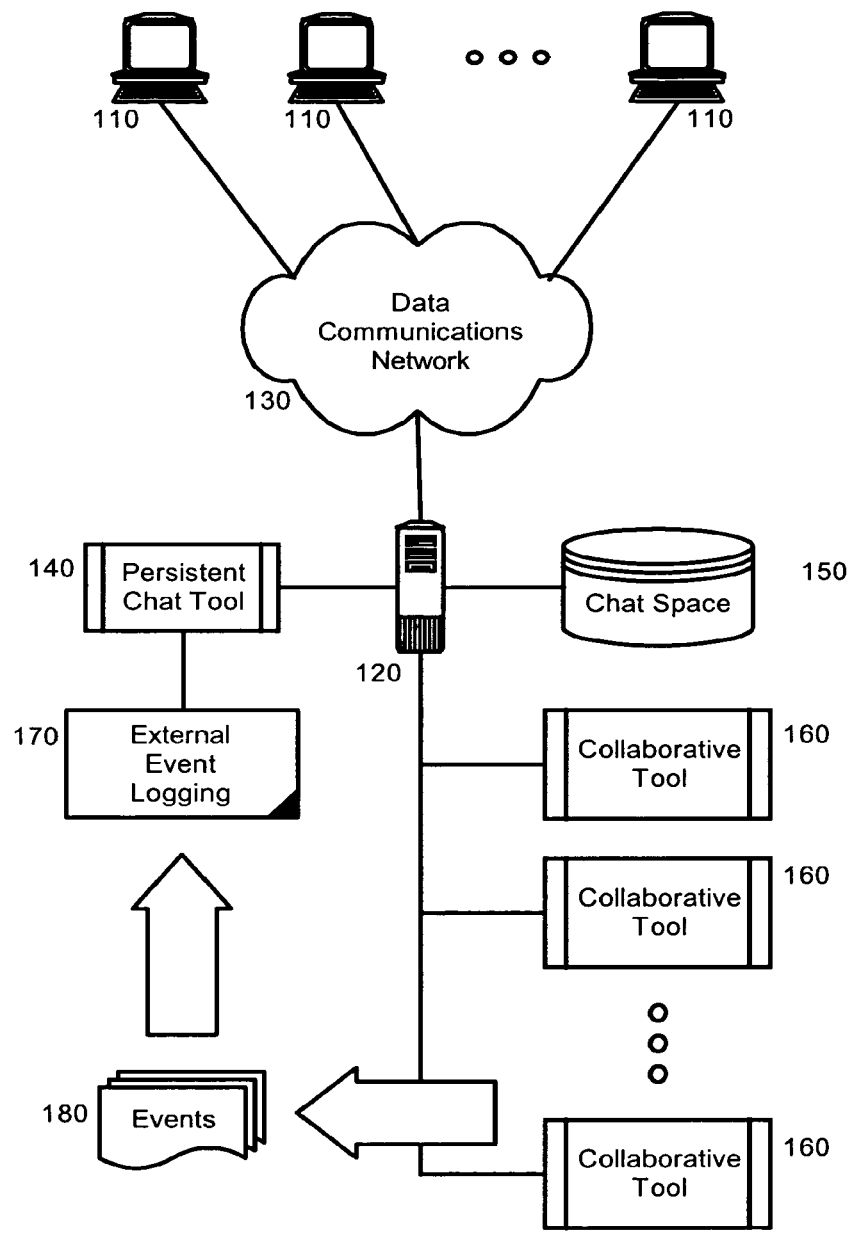
FIG. 1 is a schematic illustration of a collaborative computing system which has been configured for external event logging in a persistent chat in accordance with a preferred aspect of the inventive arrangements.

In further illustration of the preferred aspect of the invention, FIG. 1 is a schematic illustration of a collaborative computing system which has been configured for external event logging in a persistent human-to-human conversational space. In the system of the invention, a collaborative computing server 120 can be coupled to one or more collaborative computing clients 110 over a data communications network 130. The collaborative computing server 120 can host one or more collaborative tools 160 including a human-to-human conversational tool such as a persistent chat tool 140. Notably, additional collaborative computing servers (not shown) can host individual ones or combinations of ones of the collaborative tools 160 as centralizing any one of the collaborative tools 160 in any one computing device is not required. To that end, conceptually, the collaborative server 120 can represent one or more back-end computing devices hosting one or more collaborative tools 160 including the persistent chat tool 140.

The persistent chat tool 140 of the present invention can create a persistent chat 150 for a selection of collaborators who can access the persistent chat 150 through corresponding collaborative computing clients 110. In this regard, as compared to a rudimentary instant messaging system, the chat 150 of the present invention can persist regardless of whether any one collaborator remains logged into the chat 150. While in existence, collaborators can post turns to the chat 150 so that the chat 150 can form a lasting record of the collaboration among the collaborators. Generally, to maintain the persistent state of the chat 150, the chat 150 can be stored in a database form so that the postings to the chat 150 can be organized in a manner suitable for visualizing the collaboration.

Importantly, an external event logging process 170 can be coupled to the persistent chat tool 140. The external event logging process 170 can receive notifications of events 180 occurring externally to the chat 150. Examples can include the creation of timestamps for files, messages, or even other chats managed by the collaborative tools 160 within the collaborative environment. Examples further can include meta-data regarding files, messages and other chat spaces such as the author of a file, message or turn, the topic/title/subject of the file, message or turn. Examples yet further can include the entry and exit times when collaborators join and leave sessions managed using the collaborative tools 160. In any event, upon receiving a notification of an event 180, the external logging process 170 can transform the notification into a turn which can be added to the chat 150.

Figure 2:
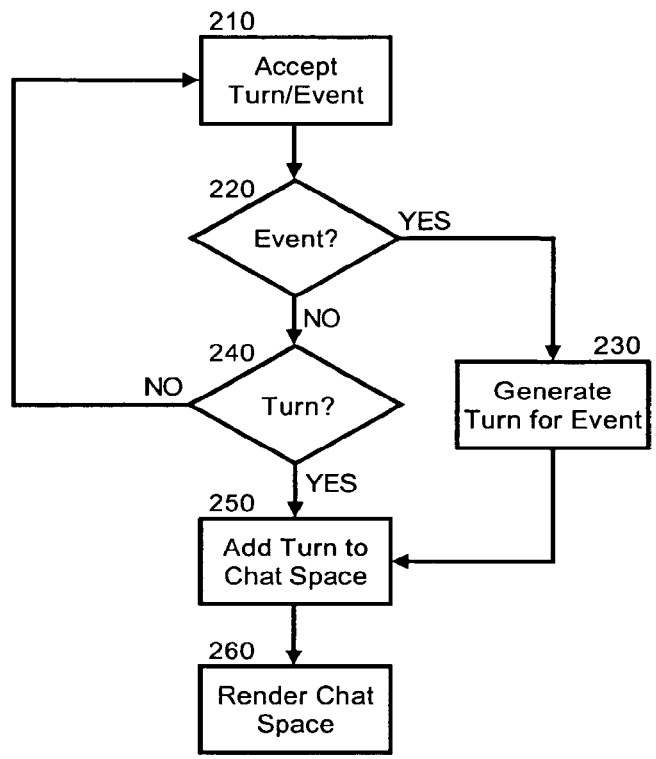
FIG. 2 is a flow chart illustrating a process for logging external events in a persistent chat in the system of FIG. 1; and, FIG. 3 is a schematic illustration of a collaborative computing system having a persistent chat tool coupled to a cross-chat query interface.

In more particular illustration, FIG. 2 is a flow chart illustrating a process for logging external events in a persistent chat in the system of FIG. 1. Beginning in block 210, the persistent chat tool can accept input in the form of a turn or an event. In decision block 220, if the input is an event, then in block 230 a turn can be created for the event, such as a textual description of the event, an embedded link to the event, or an embedded representation of the event, or an embedded link to the subject matter of the event such as a hotlink or a doc-link. Optionally, the turn generated for the event can be a well-formed markup language representation of the event, such as an XML formatted data structure able to be processed in an automated manner. In any case, in block 250 the turn—whether provided by the collaborator, as in block 240, or generated from an event notification, as shown in block 230—can be added to the chat and in block 260 the chat can be rendered for viewing by the collaborators.

Figure 3:
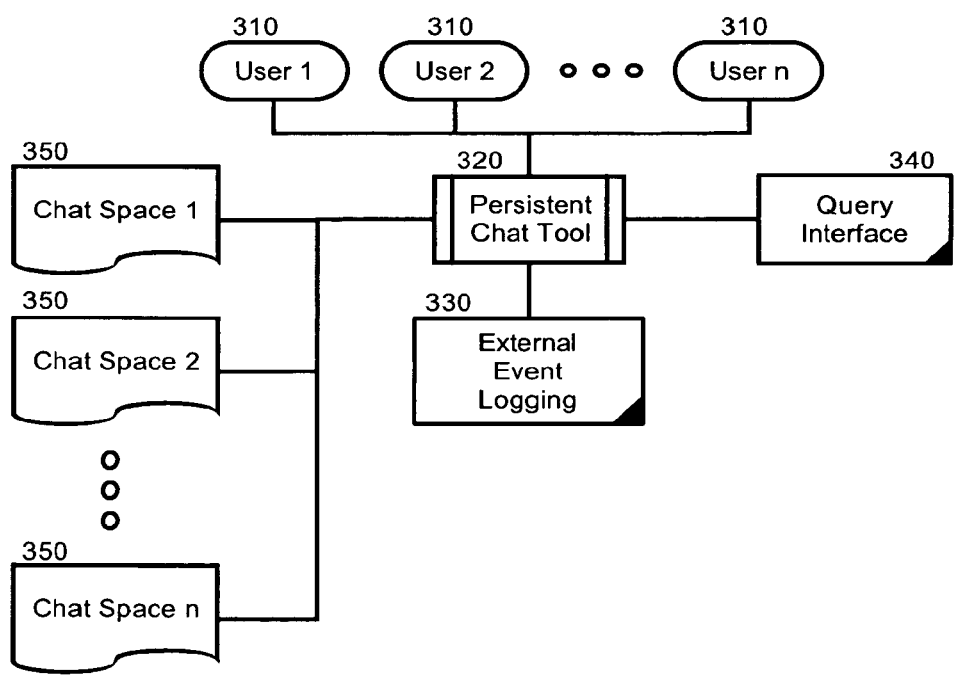

Notably, in an alternative aspect of the present invention, a query search engine can be coupled to the persistent chat tool so as to facilitate the mining of collaborative data across individual and multiple persistent chat spaces. In further illustration, FIG. 3 depicts a collaborative computing system having a persistent chat tool coupled to a cross-chat query interface. As shown in FIG. 3, a persistent chat tool 320 can be coupled not only to an external event logging processor 330, but also the persistent chat tool 320 can be coupled to a query interface 340. Individual collaborators 310 can register for participation in one more persistent chats 350. Using the query interface 340, the content of the chats 350 can be queried to identify turn information, author information and the like.

In this regard, preferably the chats 350 can be viewed as a single chat for purposes of performing query operations. Examples include:

What chats can a user access?
To which chats does a particular user belong?
To which chats has a user recently posted a turn?
In which chat is a user presently participating?
Which chats have been updated recently with new turns?
Which chats have been updated recently with new turns relating to external events?

Which chats have been updated recently with a turn of a particular content type?

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A persistent human-to-human conversational system, comprising:
    a persistent human-to-human conversational tool executing in memory of a server; and,
    an external event processor coupled to the human-to-human conversational tool and executing in at least one processor of the server, the external event processor enabled to
    persist a human-to-human conversational space;
    post turns in the persistent human-to-human conversational space;
    receive different notifications of external events, the different notifications of external events indicate events occurring externally to said persistent human-to-human conversational space, the external events including a creation of a timestamp for a file, a creation of a timestamp for a different human-to-human conversational space, a creation of meta-data for a file, a creation of meta-data for a message, and a creation of meta-data for a different human-to-human conversational space;
    responsive to receiving said notifications of external events, convert said notifications of external events into respectively different textual descriptions of the different notifications of external events; and,
    further post the converted different textual descriptions of the different notifications of external events in said persistent human-to-human conversational space.

2. The persistent human-to-human conversational system of claim 1, further comprising a query interface coupled to the persistent human-to-human conversational tool.

3. The persistent human-to-human conversational system of claim 1, further comprising a plurality of collaborative tools communicatively linked to the persistent human-to-human conversational tool.

4. The persistent human-to-human conversational system of claim 1, wherein the persistent human-to-human conversational tool is a persistent chat tool.

5. The persistent human-to-human conversational system of claim 1, wherein the external event processor is further enabled to
    persist additional human-to-human conversational spaces; and,
    perform query operations against said human-to-human conversational space and said additional human-to-human conversational spaces.

6. The persistent human-to-human conversational system of claim 1, wherein the converting step further comprises creating hyperlinks for content relating to the notifications.

7. The persistent human-to-human conversational system of claim 1, wherein the converting step further comprises creating doc-links to documents related to the notifications.

8. The persistent human-to-human conversational system of claim 1, wherein the converting step further comprises creating embeddable content related to said notifications.

9. The persistent human-to-human conversational system of claim 1, wherein the converting step further comprises of creating markup language formatted content related to the notifications.

10. The persistent human-to-human conversational system of claim 1, wherein the external events further include a creation of a timestamp for a message, a collaborator entering a collaboration session managed using a collaborative tool, and a collaborator leaving a collaboration session managed using a collaborative tool.

* * * * *